United States Patent
Lin et al.

(10) Patent No.: US 7,653,035 B2
(45) Date of Patent: Jan. 26, 2010

(54) INTERFERENCE REJECTION IN WIRELESS RECEIVERS

(75) Inventors: Xintian E. Lin, Mountain View, CA (US); Qinghua Li, Sunnyvale, CA (US); Camille C. Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 11/017,517

(22) Filed: Dec. 20, 2004

(65) Prior Publication Data

US 2006/0133259 A1    Jun. 22, 2006

(51) Int. Cl.
*H04W 4/00* (2006.01)
*H04J 4/00* (2006.01)
*H04B 15/00* (2006.01)
*H04B 17/00* (2006.01)
*H04M 1/00* (2006.01)

(52) U.S. Cl. ........................ 370/338; 370/478; 370/330; 375/285; 375/346; 455/67.13; 455/226.3; 455/552.1

(58) Field of Classification Search ........................ None
See application file for complete search history.

(56) References Cited

U.S. PATENT DOCUMENTS

| 6,304,545 | B1 | 10/2001 | Armbruster et al. | |
| 2001/0010689 | A1* | 8/2001 | Awater et al. | 370/344 |
| 2002/0051498 | A1* | 5/2002 | Thomas et al. | 375/262 |
| 2003/0002471 | A1 | 1/2003 | Crawford et al. | |
| 2003/0054755 | A1* | 3/2003 | Zehavi et al. | 455/1 |
| 2004/0156456 | A1* | 8/2004 | Wu et al. | 375/346 |
| 2004/0242159 | A1* | 12/2004 | Calderon et al. | 455/63.3 |
| 2005/0008092 | A1* | 1/2005 | Kadous | 375/267 |
| 2005/0152317 | A1* | 7/2005 | Awater et al. | 370/338 |
| 2005/0265218 | A1* | 12/2005 | Molisch et al. | 370/203 |
| 2005/0266808 | A1* | 12/2005 | Reunamaki et al. | 455/101 |
| 2006/0062322 | A1* | 3/2006 | Namgoong et al. | 375/285 |
| 2006/0114981 | A1* | 6/2006 | Ghosh et al. | 375/232 |

(Continued)

FOREIGN PATENT DOCUMENTS

EP    1389855 A2    2/2004

(Continued)

OTHER PUBLICATIONS

International Search Report and Written Opinion of the Inernational Searching Authority; Apr. 14, 2006; PCTUS2005046695, 12 pgs.

(Continued)

*Primary Examiner*—Ricky Ngo
*Assistant Examiner*—Clemence Han
(74) *Attorney, Agent, or Firm*—Dana B. LeMoine; LeMoine Patent Services, PLLC (57) ABSTRACT

The effects of interference are mitigated in a wireless system through update noise variance estimates. Noise variance estimates may be update after the reception of a preamble in an OFDM receiver. Noise variance estimates may include averages of signal energy over multiple symbols in one OFDM tone and over multiple OFDM tones. A co-located wireless personal area network (WPAN) interface may signal its presence a wireless local area network (WLAN) interface, which may select a noise variance estimate algorithm based therein.

12 Claims, 7 Drawing Sheets

U.S. PATENT DOCUMENTS

2006/0211377 A1* 9/2006 Shoemake et al. ....... 455/67.13

FOREIGN PATENT DOCUMENTS

WO    WO-2004015946 A1    2/2004

OTHER PUBLICATIONS

Ghosh, M., et al., "Bluetooth Interference Cancellation for 802.11g WLAN receivers", *IEEE International conf. On communications*, 2 of 5, ISBN: 0-7803-7802-4,(May 11, 2003),1169-1173 pgs.

Bar-Shalom, Ofer, et al., "On the Union of WPAN and WLAN in Mobile Computers and Hand-Held Devices", vol. 07, Issue 02, (Aug. 19, 2003),pp. 20-36.

Chinn, Gordon, et al., "Mobile PC Platforms Enabled with Intel Centrino Mobile Technology", vol. 07, Issue 02, (May 21, 2003), pp. 6-15.

\* cited by examiner

FIG. 1
PRIOR ART

FIG. 2
PROR ART

INTERFERENCE REJECTION IN WIRELESS RECEIVERS

FIELD

The present invention relates generally to wireless communications, and more specifically to interference rejection in wireless receivers.

BACKGROUND

Various types of wireless communications devices are becoming commonplace. With the proliferation of wireless communications devices comes the increased likelihood that they may interfere with each other.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
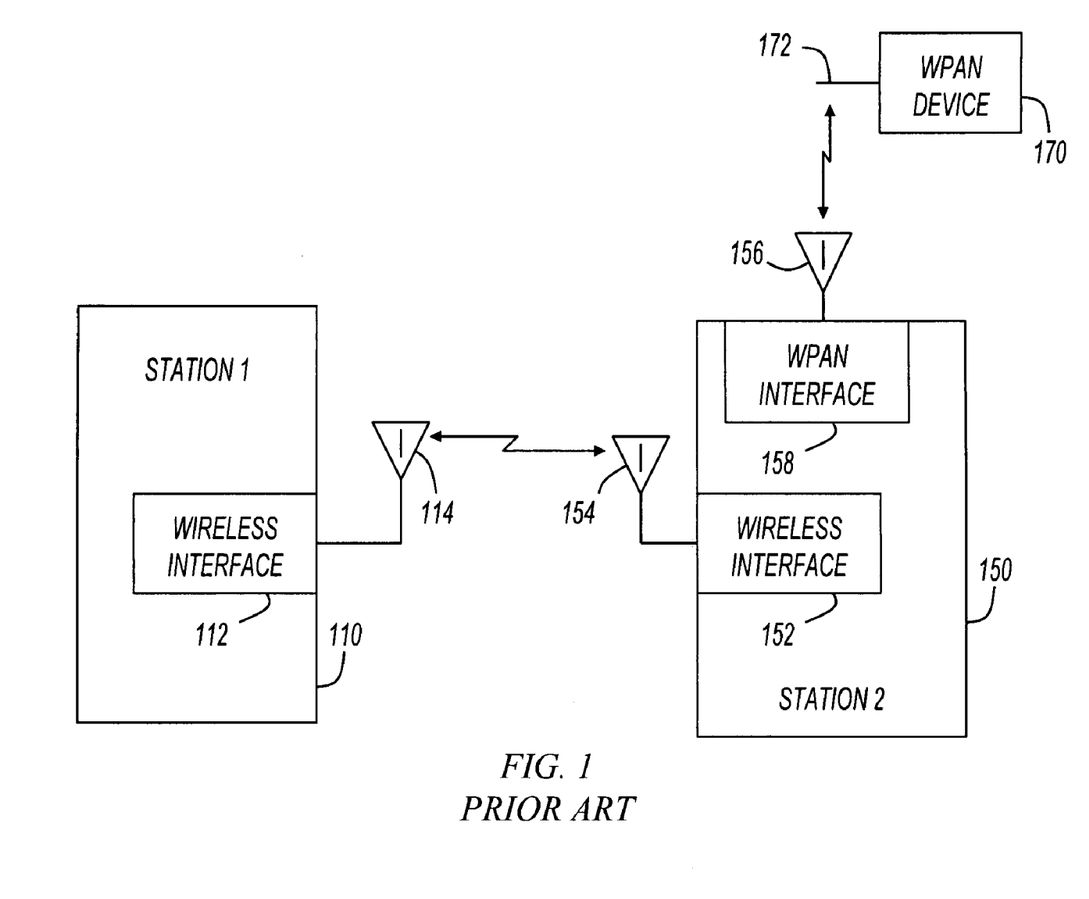
FIG. 1 shows nodes in a wireless network.

FIG. 1 shows a diagram of two wireless stations: station 110, and station 150; and a wireless personal area network (WPAN) device 170. In some embodiments, stations 110 and 150 are part of a wireless local area network (WLAN). For example, one or more of stations 110 and 150 may be an access point in a WLAN. Also for example, one or more of stations 110 and 150 may be a mobile station such as a laptop computer, personal digital assistant (PDA), or the like. Further, in some embodiments, stations 110 and 150 are part of a wireless wide area network (WWAN). For example, one or more of stations 110 and 150 may be a base station or a subscriber unit. Although only two stations are shown in FIG. 1, any number of stations may be present without departing from the scope of the present invention.

Station 110 includes wireless interface 112, and station 150 includes wireless interface 152 and WPAN interface 158. In some embodiments, wireless interfaces 112 and 152 may operate partially in compliance with, or completely in compliance with, a wireless network standard. For example, wireless interfaces 112 and 152 may operate partially in compliance with a standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition. Also for example, wireless interfaces 112 and 152 may operate partially in compliance with any other standard, such as any IEEE wireless wide area network (WWAN) standard.

Wireless interfaces 112 and 152 may be coupled to any number of antennas. In the example of FIG. 1, antenna 114 is shown as a single antenna coupled to wireless interface 112, and antenna 154 is shown as a single antenna coupled to wireless interface 152, although this is not a limitation of the present invention. For example, antenna 114 may include multiple physical antennas, and antenna 154 may include multiple physical antennas.

The "channel" through which stations 110 and 150 communicate may include many possible signal paths. For example, when stations 110 and 150 are in an environment with many "reflectors" (e.g. walls, doors, or other obstructions), many signals may arrive from different paths. This condition is known as "multipath." In some embodiments, stations 110 and 150 utilize multiple antennas to take advantage of the multipath and to increase the communications bandwidth. For example, in some embodiments, stations 110 and 150 may communicate using Multiple-Input-Multiple-Output (MIMO) techniques. In general, MIMO systems offer higher capacities by utilizing multiple spatial channels made possible by multipath.

In some embodiments, stations 110 and 150 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM utilizes multiple frequency sub-carriers in each spatial channel such that the spectrum occupied by each sub-carrier exhibits a more flat channel characteristic. Scaling appropriate for each sub-carrier may be implemented to correct any sub-carrier attenuation. Further, the data carrying capacity of each sub-carrier may be controlled dynamically depending on the fading characteristics of the spectrum occupied by the sub-carrier.

WPAN device 170 is coupled to antenna 172, and WPAN interface 158 is coupled to antenna 156. As shown in FIG. 1, WPAN device 170 may be any device capable of communicating with station 150 over a personal area network. For example, WPAN device 170 may be a Bluetooth compliant device such as a wireless headset or cellular phone. In some of these embodiments, station 150 may be a notebook computer, and WPAN device 170 may provide audio enhancements or modem capabilities.

The WPAN communications may cause interference to the communications between wireless interfaces 112 and 152. For example, WPAN interface 158 is co-located with wireless interface 152, and may cause interference. Further, WPAN device 170 may cause interference with one or both of wireless interfaces 112 and 152. Other devices may also cause interference to the operation of one or both wireless interfaces 112 and 152. For example, devices such as cordless phones, baby monitors, microwave ovens, and garage door openers may cause interference.

Various embodiments of the present invention mitigate the interference described above using various techniques. In some embodiments, a wireless interface may receive information from another device to aid in the interference detection. For example, WPAN interface 158 may provide a signal to wireless interface 152 to signify that the two interfaces are co-located, and wireless interface 152 may modify its interference detection algorithm accordingly. In other embodiments, narrowband interference may be detected by a wireless interface such as wireless interface 152 without receiving information from a co-located interface.

In addition, various embodiments of the present invention may mitigate the interference described above by updating a noise variance estimate based on received data. For example, a noise variance may be estimated during reception of a data packet preamble to aid in interference mitigation. Further, the noise variance estimate may be updated during reception of data as well. By updating the noise variance estimate, the various embodiments of the present invention may mitigate the effects of narrowband interference in each OFDM sub-carrier.

In various embodiments of the present invention, transmitters utilize forward error correction (FEC). For example, a transmitter may encode a data stream using convolutional encoding, block turbo coding, convolutional turbo coding, low density parity codes (LDPC), or other coding schemes. It may employ Hybrid ARQ as well. Further, a receiver may decode the data stream using an appropriate decoder. For example, a Viterbi decoder may be used at a receiver to decode a convolutionally coded data stream. As used herein, the terms "coding" and "decoding" are meant to encompass the operations associated with any of the possible forward error correction schemes, including those listed above, as well as others. Further, various embodiments may be described with reference to convolutional encoding, but the invention is not so limited. For example, embodiments described with reference to convolutional encoding may utilize other types of FEC without departing from the scope of the present invention.

Figure 2:
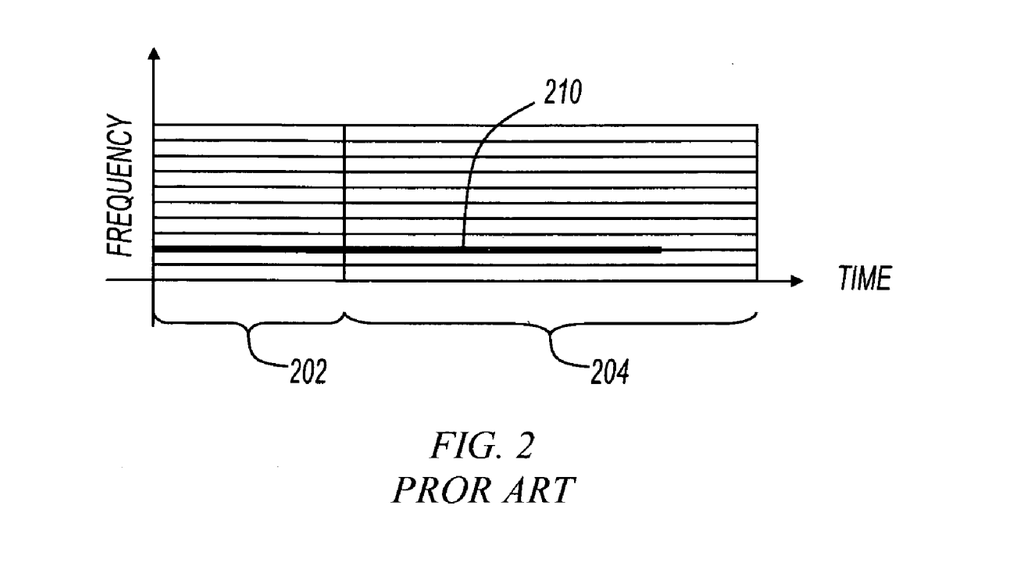
FIGS. 2 and 3 show signals interfering with a packet in an orthogonal frequency division (OFDM) system.
Figure 3:
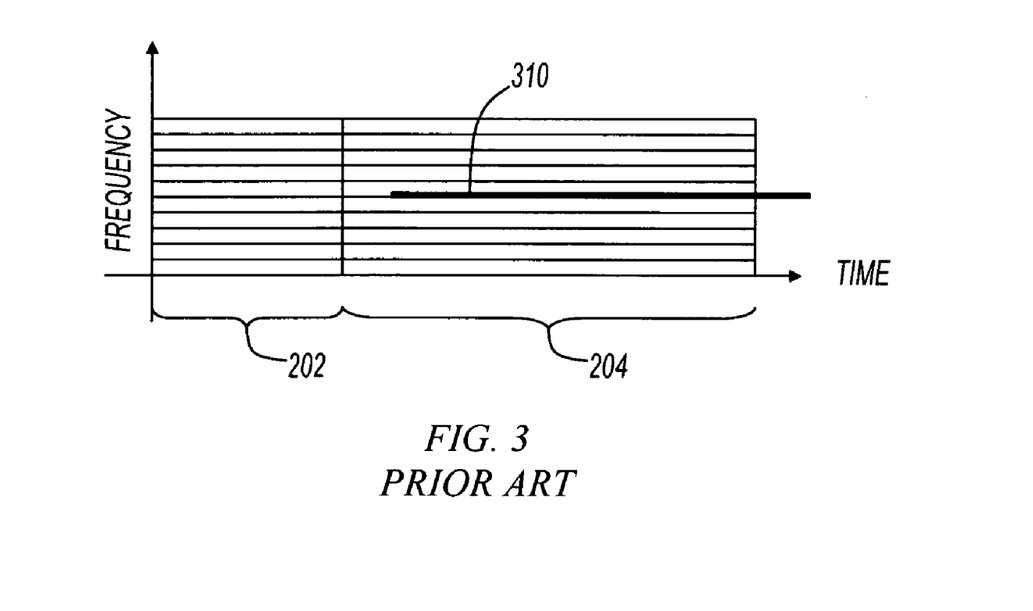

FIGS. 2 and 3 show signals interfering with a packet in an orthogonal frequency division (OFDM) system. As shown in FIGS. 2 and 3, the horizontal axis represents the passage of time from left to right, and the vertical axis represents the frequency of OFDM sub-carriers. FIGS. 2 and 3 show ten OFDM sub-carriers, although this is not a limitation of the present invention. For example, some embodiments of the present invention utilize an IEEE 802.11g compliant wireless interface that transmits and receives 52 OFDM sub-carriers.

The packets are separated into 2 parts: the preamble 202 and the data 204, the point of separation being indicated by a vertical line. The preamble may be any length. For example, in some embodiments, the time span T_p of the preamble is 16 microseconds. Further, in some embodiments, the data length, T_d, is on the order of a few hundred microseconds up to two milliseconds, or greater. The thick horizontal lines 210 and 310 represent narrowband interference.

FIG. 2 shows interference starting at or before the preamble, and FIG. 3 shows interference starting after the preamble. Various embodiments of the present invention include a receiver that performs noise variance estimates for each of the OFDM sub-carriers during reception of the preamble as well as during reception of the data. By continuously updating the noise variance estimates, the presence of interference may be detected and the effects thereof mitigated, even when the interference appears after the preamble as shown in FIG. 3.

Figure 4:
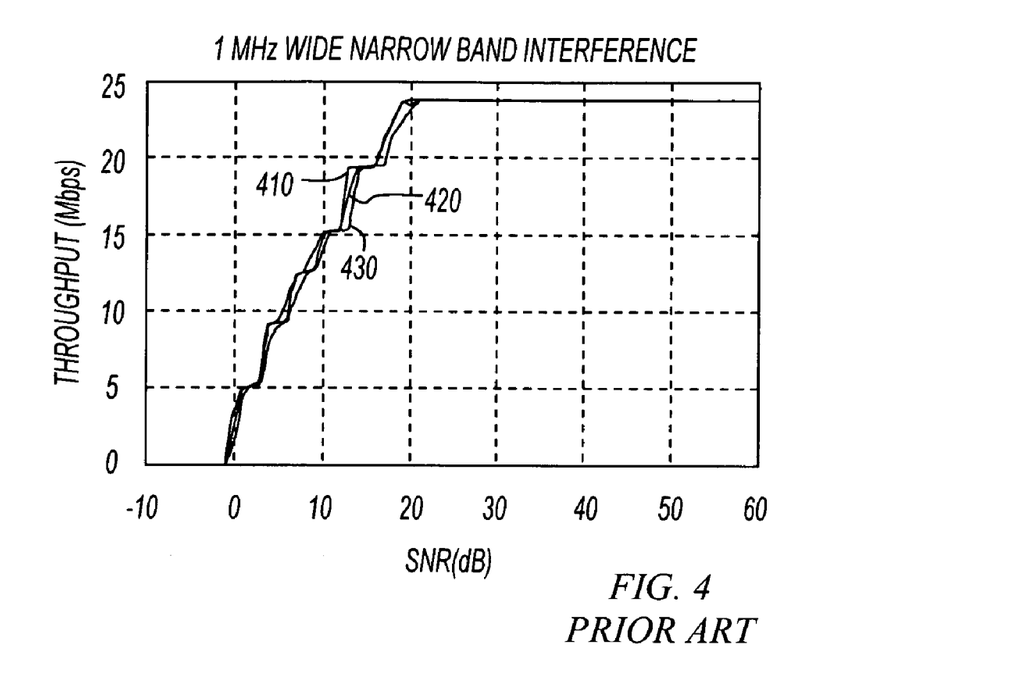
FIGS. 4 and 5 show performance of systems subject to the interference of FIGS. 2 and 3.
Figure 5:
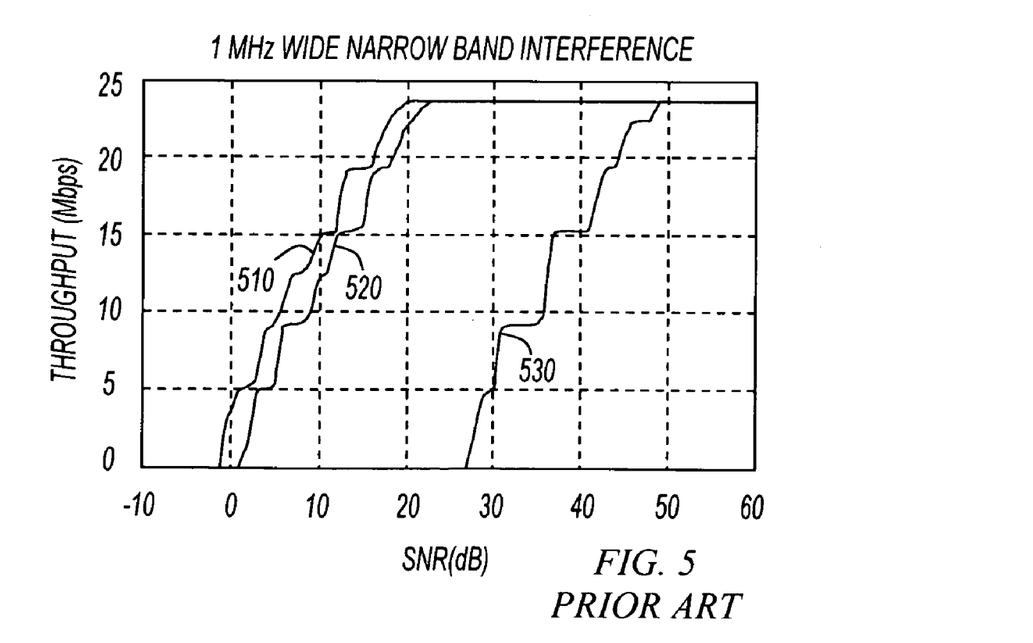

FIGS. 4 and 5 show performance of systems subject to the interference of FIGS. 2 and 3. FIG. 4 shows performance of a system subject to the interference of FIG. 2. In FIG. 4, the receiver has an accurate noise variance estimate that was generated during the reception of the preamble. Because the interference is present during the preamble, the interference was measured as "noise," and the noise variance estimate accurately reflects the combination of noise and interference. The decoder in the receiver may utilize this noise variance estimate to mitigate the effect of the interference. Depending on the available information on the interference, the system can compensate for the interference or reduce the weight of the noisier sub-carrier contribution and achieve lower decoding errors. FIG. 4 shows the result of using lower weight for the noisy sub-carriers. The horizontal axis is the signal to noise ratio in dB scale. The three curves represent different levels of interference power. Curve 410 has interference to noise ratio (I/N) of −20 dB; essentially representing the case of no interference. Curves 420 and 430 are for I/N=10 dB and I/N=40 dB respectively. It is worth noting that the interference bandwidth is only 1 MHz and 802.11g has a bandwidth of about 16 MHz (12 in dB scale), therefore the carrier to interference ratio (C/I) is equal to about 2 dB and −28 dB, respectively. The fact that radio performance degrades only a fraction of a dB shows the strong error correction capability of the forward error correction when the interference information is used properly.

FIG. 5 is presented to illustrate performance degradation when the noise variance estimate is not updated after the preamble of the packet. In the simulation that produced FIG. 5, noise variance estimates are not updated during the data phase of the packet. Because the interfering signal begins during the data phase of the packet, the correct noise variance is not available to the convolutional decoder, and the decoder loses significant performance due to the interference. The erroneous noise variance estimate does not provide the convolutional decoder enough information to properly weight the decision matrix. As in FIG. 4, the three curves represent different levels of interference power. Curve 510 has an I/N of −20 dB; curve 520 has an I/N of 10 dB; and curve 530 has an I/N of 40 dB. The performance loss asymptotically approaches (Interference power+noise power)/noise power.

As described below, when various embodiments of the present invention are applied in an OFDM receiver, the effects of a strong narrowband interfering signal may be mitigated. For example, in an IEEE 802.11g (OFDM) receiver, a strong Bluetooth compliant interfering signal may be rejected with little degradation up to the level that saturates the radio frequency (RF) front end.

Figure 6:
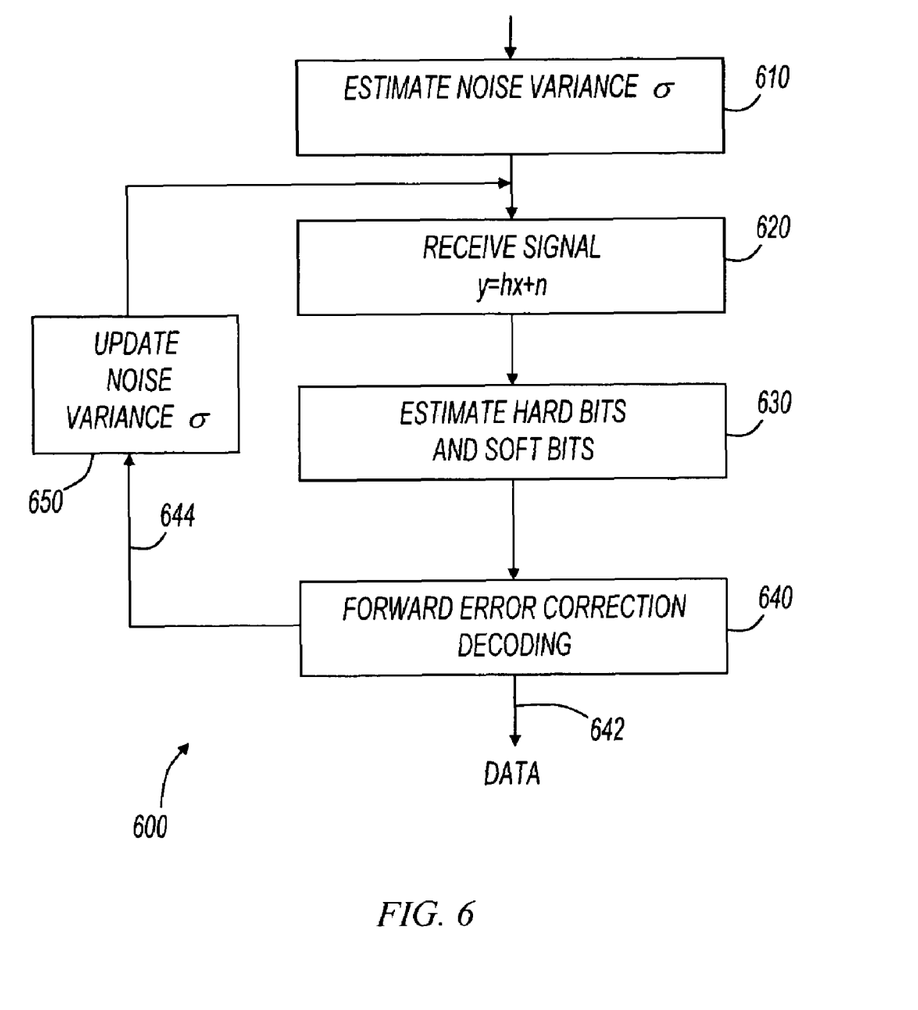
FIGS. 6 and 7 show flowcharts in accordance with various embodiments of the present invention.

FIG. 6 shows a flowchart in accordance with various embodiments of the present invention. Method 600 represents the operations of an OFDM receiver when updating the noise variance estimate during data reception. At 610, the noise variance is estimated for each tone in an OFDM signal. For example, at 610, the preamble of an OFDM data packet may be utilized to synchronize the data packet and estimate the noise variance in each tone. At 620, the signal y=hx+n is received, where y, h, x, and n, are the received signal, the effects of the channel, the transmitted symbol, and noise, respectively.

At 630, hard bits (b_h) and soft bits (b_s) are estimated. Hard bits correspond to an estimate of the transmitted symbol, and soft bits indicate the log likelihood of the hard bits being correct. In some embodiments, this functionality may be implemented using a function sym2bit(y, h, σ) as:

$$(b\_s, b\_h) = sym2bit(y, h, \sigma)$$
$$\hat{x} = \underset{x \in QAM\_constellation}{\operatorname{argmin}} |y - hx|^2;$$
$$b\_h_i = QAM2bit(\hat{x}), i = 1, \ldots, N;$$
$$b\_s_i = \log\left(\frac{P(b\_h_i = 1 \mid y)}{P(b\_h_i = 0 \mid y)}\right)(\sigma), i = 1, \ldots, N;$$

where N is the number of bits in b_h. It is important to notice that the dependency on the noise variance is explicitly written in the third line. Depending on the size of the quadrature amplitude modulation (QAM) constellation, b_h may contain a different number of bits. For example, BPSK, QPSK, 16QAM and 64QAM will include 1, 2, 4 and 6 bits, respectively.

At 640, FEC decoding takes place. For example, in convolutional encoding embodiments, a Viterbi decoder may be utilized at 640. The decoder outputs data at 642, and also feeds back error information at 644. The feedback information from the decoding may be used at 650 to update the noise variance. The next received symbol at 620 may then be processed using the updated noise variance. If a narrowband interfering signal causes many raw bit errors, the noise variance will be updated at 650, and the new noise variance value will help to mitigate the effects of the interfering signal when the symbol is processed by the remainder of method 600. Iterative decoding may be used to correct for the earlier symbols.

Figure 7:
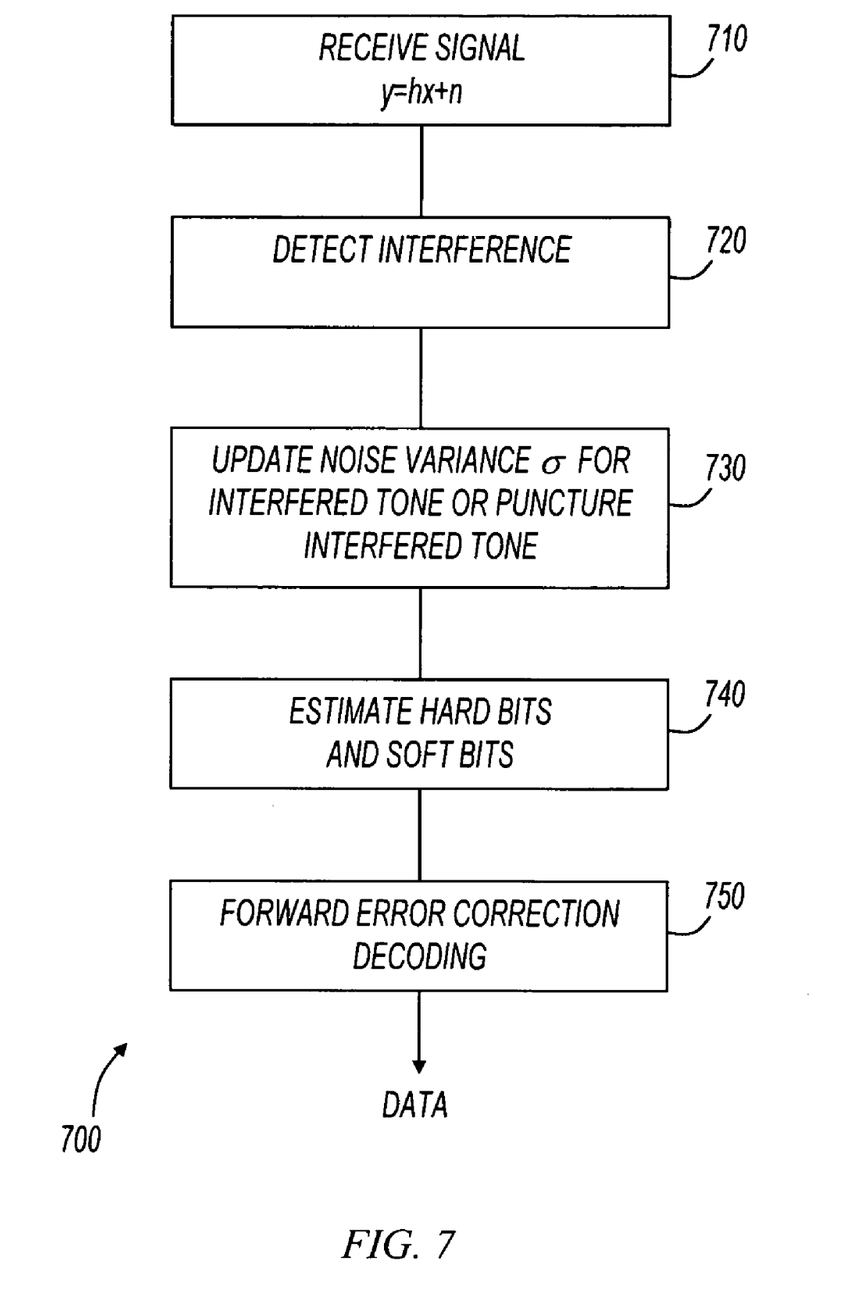

The various embodiments of the present invention make use of robust forward error correction (FEC) in which a transmitter encodes the data stream, and the receiver decodes the data stream. By determining the interference in each OFDM sub-carrier, or "tone," and modifying the noise variance estimate, the soft bit estimate may also be modified, and the effects of the interferer may be mitigated. In some embodiments, the noise variance estimate may be continuously updated on a symbol-by-symbol basis. In other embodiments, the noise variance estimate is updated less frequently than on a symbol-by-symbol basis. As described above, embodiments represented by FIG. 6 utilize feedback from the FEC decoding stage in the receiver. FIG. 7, described next, represents embodiments that do not necessarily have feedback from the FEC decoding stage.

Referring now to FIG. 7, a signal y=hx+n is received at 710, where y, h, x, and n have the same meaning as described above with reference to FIG. 6. At 720, interference, if present, is detected; at 730, the noise variance corresponding to the interfered OFDM tone is updated or the interfered tone is punctured; and at 740, hard bits and soft bits are estimated. After hard bits and soft bits are estimated, FEC decoding may take place at 750.

Various embodiments of the acts of blocks 720, 730, and 740 are described below as an alternative implementation of sym2bit(y, h, σ), although this is not a limitation of the present invention. For example, in some embodiments, the acts of blocks 720, 730, and 740 are implemented in separate functions, or across distributed processing elements.

Various embodiments of the present invention may or may not utilize the temporal and frequency locality of the interference to detect its presence and update the noise variance. For example, the energy of a symbol in a tone may be compared to the energy of symbols in the same tone, or may be compared to energy of symbols in other tones. The following pseudo code illustrates the algorithm:

$$(b\_s, b\_h) = sym2bit(y, h, \sigma) \quad (1)$$
$$\hat{x} = \underset{x \in QAM\_constellation}{\operatorname{argmin}} |y - hx|^2;$$
$$b\_h_i = QAM2bit(\hat{x}), i = 1, \ldots, N;$$
$$d(j, k) = \frac{1}{(m+1)(n+1)} \sum_{p=j-n/2}^{j+n/2} \sum_{q=k-m/2}^{k+m/2} y(p, q);$$
$$\text{if}(|d(j, k)| > \text{threshold}) \quad \sigma(j, k) = |d(j, k)|;$$
$$b\_s_i = \log\left(\frac{P(b\_h_i = 1 \mid y)}{P(b\_h_i = 0 \mid y)}\right)(\sigma), i = 1, \ldots, N;$$

To exhibit the possible dependence on time and tones, two indexes have been added to the expression, the first index is the symbol index in time; the second is the tone labels. The decision variable d(j,k) is formed by taking an average over neighboring n+1 symbols and neighboring m+1 tones. To reduce latency, n may be set to zero or one. Further, any number of previous symbols or later symbols may be utilized in any combination. The value of m may be selected based on the expected coherent bandwidth of the interferer. The best value for m and n may depend on the interference source frequency/time coherence. It may be estimated by the network interface controller (NIC) based on past log or information from other components. For example, a choice of m=3 is a reasonable value for Bluetooth interference. In some embodiments, the "threshold" may be set as follows:

$$\text{threshold} = \alpha \begin{cases} 1 & BPSK \\ 1 & QPSK \\ \sqrt{10} & 16QAM \\ \sqrt{42} & 64QAM \end{cases}$$

The coefficient α may have any value. For example, α may have a value in the range from 2-4. In some embodiments, the noise variance estimate can be more aggressive. For example, the noise variance may be computed as:

$$\sigma(i, j) = \max_{i-1 < k \le i}(|d(k, j)|);$$

where the past l decision variables are considered. In some embodiments, l may be large enough to include all the previous symbols in the current packet.

In various embodiments of the present invention, an interfering signal may be detected without utilizing temporal and frequency locality of the interference. For example, in the case of large narrowband interference, like that present as a result of a co-located Bluetooth device, the following sym2bit function may be utilized:

$$(b\_s, b\_h) = sym2bit(y, h, \sigma)$$
$$\hat{x} = \underset{x \in QAM\_constellation}{\operatorname{argmin}} |y - hx|^2;$$
$$b\_h_i = QAM2bit(\hat{x}), i = 1, \ldots, N;$$

-continued $$error = \frac{|y - h\hat{x}|}{\sigma};$$

if(error > threshold)

b_s$_i$ = 0; i = 1, ... , N; % equivalent to $\sigma = \infty$ else $$b\_s_i = \log\left(\frac{P(b\_h_i = 1 \mid y)}{P(b\_h_i = 0 \mid y)}\right)(\sigma), \quad i = 1, \ldots, N;$$

end

The threshold value may be set to any suitable threshold. For example, the threshold may be determined heuristically for a given application. This sym2bit function has been simulated with a threshold value of between 2.6 and 4.9, and all performed well. Simulation results are shown in FIG. 8.

Figure 8:
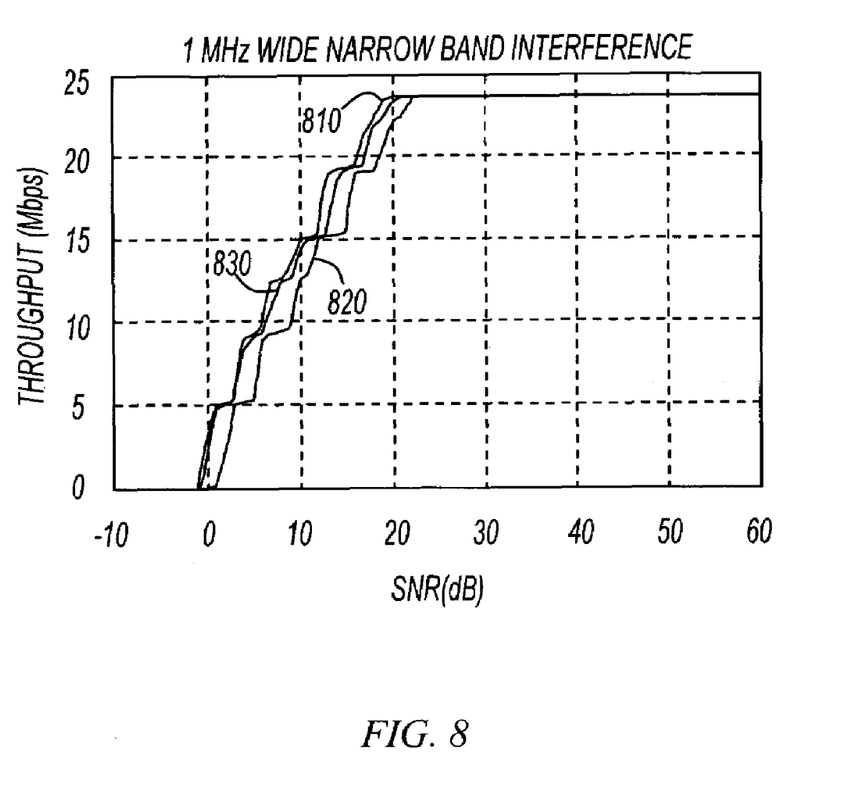
FIG. 8 shows simulation results in accordance with various embodiments of the present invention.

FIG. 8 shows simulation results in accordance with various embodiments of the present invention. Bluetooth interference was modeled in the simulation at various interference-to-noise (I/N) ratios. The three curves represent different levels of interference power. Curve 810 has interference to noise ratio (I/N) of −20 dB; essentially representing the case of no interference. Curves 820 and 830 are for I/N=10 dB and I/N=40 dB respectively. It is noted that with 10 dB I/N ratio, this algorithm loses about 2 dB in performance. However, with larger interference (curve 830), the performance is improved. This demonstrates that this algorithm works well in separating out the larger interferer from the thermal noise.

Figure 9:
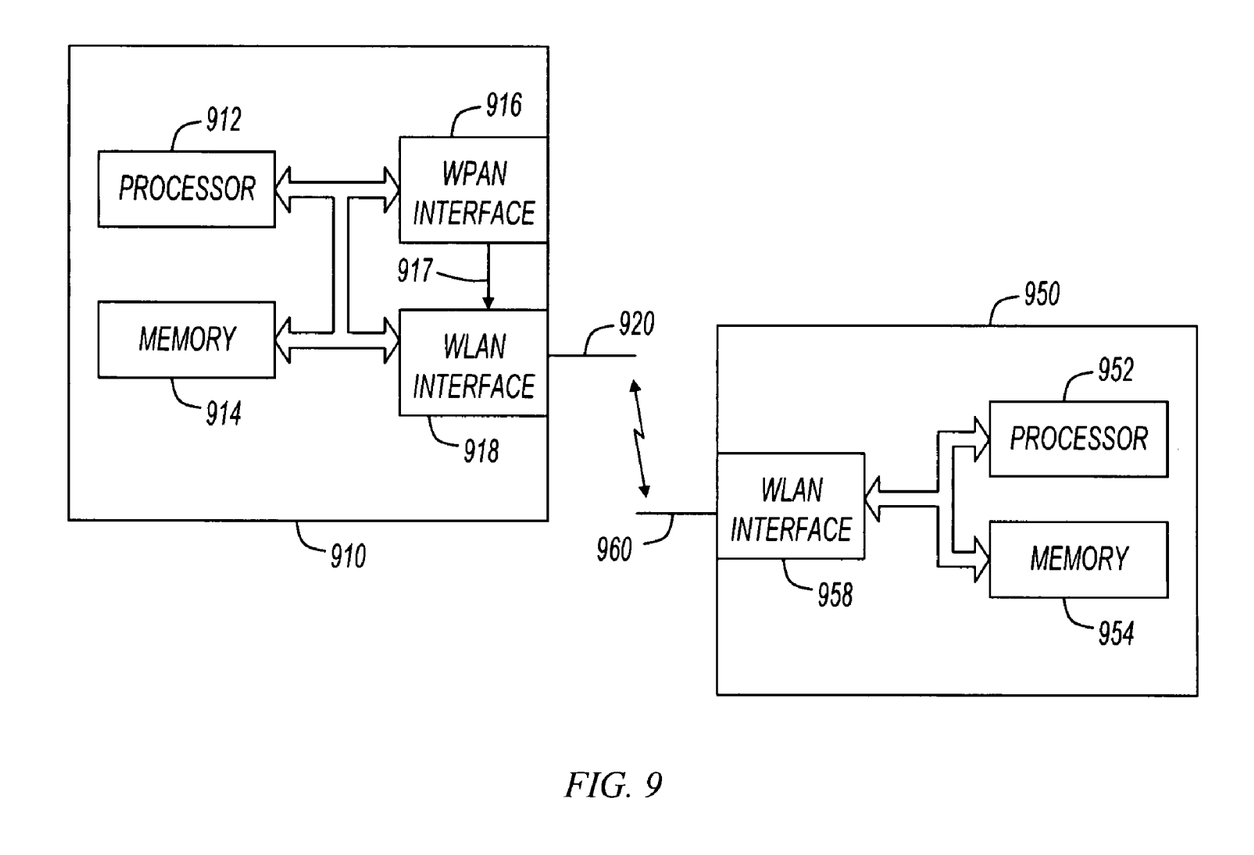
FIG. 9 shows a system diagram in accordance with various embodiments of the present invention.

FIG. 9 shows a system diagram in accordance with various embodiments of the present invention. The system diagram of FIG. 9 includes two electronic systems, 910 and 950. System 910 includes processor 912, memory 914, WPAN interface 916, WLAN interface 918, and antenna 920. System 950 includes processor 952, memory 954, WLAN interface 958, and antenna 960.

Electronic systems 910 and 950 may be of any type that may communicate using wireless signals. For example, in some embodiments, either of electronic systems 910 and 950 may represent a system that includes a WLAN access point, a mobile station, a base station, or a subscriber unit as well as other circuits. Also for example, in some embodiments, either of the electronic systems may be a computer, a handheld computing device, a wireless-enabled telephone, or any other type of communications device. Further, systems 910 and 950 may be nodes in a wireless network, such as stations 110 and 150 (FIG. 1).

WPAN interface 916 may any type of personal area network interface. For example, in some embodiments, WPAN interface 916 is a Bluetooth compliant interface that provides WPAN connectivity for electronic system 910. WLAN interfaces 918 and 958 may be any type of WLAN interface, including, but not limited to, an IEEE 802.11 compliant interface.

WPAN interface 916 and WLAN interface 918 are co-located in electronic system 910. In some embodiments, WPAN interface 916 provides an indication of its presence or operation on conductor 917. For example, in some embodiments, WPAN interface 916 may assert a signal on conductor 917 whenever it is present in system 910. In other embodiments, WPAN interface 916 may assert a signal on conductor 917 whenever it is operational in system 910. In some embodiments, conductor 917 is omitted.

Electronic systems 910 and 950 may utilize any of the interference detection and mitigation embodiments described above with reference to the earlier figures. For example, in some embodiments, a FEC decoder may provide error information, and may update noise variance estimates on a symbol-by-symbol basis. Further, in some embodiments, an electronic system may or may not utilize temporal and frequency locality to detect interference as described above with reference to FIG. 7. Also in some embodiments, WLAN interface 918 may operate differently based on whether a signal is asserted on conductor 917 to signify a co-located WPAN interface. For example, WLAN interface 918 may utilize temporal and frequency locality to detect interference when a WPAN interface is not co-located, and may use a simpler approach when a WPAN interface is co-located.

In operation, processors 912 and 952 read instructions and data from memories 914 and 954, respectively, and perform actions in response thereto. For example, processor 912 may access instructions from memory 914 and perform method embodiments of the present invention, such as all or a portion of method 600 (FIG. 6) or method 700 (FIG. 7) or methods described with reference to other figures. Processors 912 and 952 represent any type of processor, including but not limited to, a microprocessor, a digital signal processor, a microcontroller, or the like.

Memories 914 and 954 are memory storage elements that each represent an article that includes a machine readable medium. For example, each of memories 914 and 954 may represent a random access memory (RAM), dynamic random access memory (DRAM), static random access memory (SRAM), read only memory (ROM), flash memory, or any other type of article that includes a medium readable by either processor. Memories 914 and 954 may store instructions for performing the execution of the various method embodiments of the present invention.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
    updating a noise variance estimate during the reception of a data portion of a packet in an orthogonal frequency division multiplexing (OFDM) receiver wherein the noise variance estimate include an average signal energy over multiple symbols in multiple OFDM tones;
    determining whether a Bluetooth complaint device is co-located with the OFDM receiver through direct communication using a least one electrical conductor between the Bluetooth complaint device and the OFDM receiver; and
    selecting an algorithm to re-estimate the noise variance based on whether a Bluetooth complaint device is co-located.

2. The method of claim 1, further comprising estimating soft bits using the updated noise variance.

3. A method comprising:
    updating a noise variance estimate during the reception of a data portion of a packet in an orthogonal frequency division multiplexing (OFDM) receiver wherein the noise variance estimate includes an average signal energy over multiple symbols in a single OFDM tone;
    determining whether a Bluetooth complaint device is co-located with the OFDM receiver through direct communication using a least one electrical conductor between the Bluetooth complaint device and the OFDM receiver; and selecting an algorithm to re-estimate the noise variance based on whether a Bluetooth complaint device is co-located.

4. A method comprising:

receiving a signal having a preamble in an orthogonal frequency division multiplexing (OFDM) system;

estimating a noise variance for multiple frequency sub-carrier ion the OFDM system;

receiving a signal having data in the OFDM system;

determining whether a Bluetooth complaint device is co-located with the OFDM receiver through direct communication using a least one electrical conductor between the Bluetooth complaint device and the OFDM receiver;

selecting an algorithm to re-estimate the noise variance based on whether a Bluetooth complaint device is co-located; and re-estimating the noise variance by averaging signal energy over multiple symbols in the multiple frequency sub-carrier.

5. The method of claim 4 further comprising estimating soft bits from the re-estimated noise variance.

6. The method of claim 4 wherein re-estimating the noise variance comprises re-estimating a noise variance for each frequency sub-carrier in the OFDM system.

7. An article comprising a machine-readable medium adapted to hold instructions that when accessed result in a machine determining whether Bluetooth complaint device is co-located with an OFDM receiver through direct communication using a least one electrical conductor between the Bluetooth complaint device and the OFDM receiver, continuously estimating a noise variance for each tone in a received OFDM signal wherein estimating a noise variance comprises averaging received signal energy over a plurality of received symbols in one OFDM tone, wherein estimating a noise variance comprises using a first method to estimate the noise variance when the Bluetooth interface is co-located with the OFDM receiver, and using a second method to estimate the noise variance when no Bluetooth interface id co-located with the OFDM receiver.

8. The article of claim 7 wherein the second method comprises averaging received signal energy over a plurality of OFDM tones.

9. An electronic system comprising:

a wireless personal area network (WPAN) interface;

a wireless local area network (WLAN) interface that utilizes orthogonal frequency division multiplexing (OFDM);

and electrical conductor to form a signal path from the WPAN interface to the WLAN interface to indicate the presence of the WPAN interface in the electronic system; and a memory storage element to hold instructions that when accessed result in updating a noise variance for a received WLAN signal, wherein the noise variance describes the received WLAN signal for a time period other than a time during which a preamble is received.

10. The electronic system of claim 9 wherein the WPAN interface comprises a Bluetooth compatible device.

11. The electronic system of claim 9 wherein the WLAN interface comprises an 802.11 compatible device.

12. The electronic system of claim 9 wherein the memory storage element further holds instructions that when accessed result in updating the noise variance using a different algorithm in response to the presence of the WPAN interface.

* * * * *

UNITED STATES PATENT AND TRADEMARK OFFICE
CERTIFICATE OF CORRECTION

| | | |
|---|---|---|
| PATENT NO. | : 7,653,035 B2 | Page 1 of 1 |
| APPLICATION NO. | : 11/017517 | |
| DATED | : January 26, 2010 | |
| INVENTOR(S) | : Lin et al. | |

It is certified that error appears in the above-identified patent and that said Letters Patent is hereby corrected as shown below:

On the Title page, in Item (56), under "Other Publications", in column 2, line 2, delete "Apr. 14, 2006;" and insert -- Apr. 24, 2006; --, therefor.

On the Title page, in Item (57), under "Abstract", in column 2, line 2, delete "update" and insert -- updating --, therefor.

On the Title page, in Item (57), under "Abstract", in column 2, line 3, delete "update" and insert -- updated --, therefor.

On the Title page, in Item (57), under "Abstract", in column 2, line 9, delete "therein." and insert -- thereon. --, therefor.

In column 8, line 47, in Claim 1, delete "include" and insert -- includes --, therefor.

In column 9, line 10-11, in Claim 4, delete "sub-carrier ion" and insert -- sub-carriers in --, therefor.

In column 9, line 30, in Claim 7, after "whether" insert -- a --.

In column 10, line 7, in Claim 7, delete "id" and insert -- is --, therefor.

In column 10, line 17, in Claim 9, delete "and" and insert -- an --, therefor.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,653,035 B2  Page 1 of 1
APPLICATION NO. : 11/017517
DATED : January 26, 2010
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1409 days.

Signed and Sealed this

Twenty-eighth Day of December, 2010

David J. Kappos
*Director of the United States Patent and Trademark Office*